(12) United States Patent
Matlin

(10) Patent No.: US 11,809,215 B2
(45) Date of Patent: Nov. 7, 2023

(54) CONTROLLED DISPLAY OF DYNAMIC DATA

(71) Applicant: S&P Global Inc., New York, NY (US)

(72) Inventor: Jamie Matlin, Montreal (CA)

(73) Assignee: S&P Global Inc., New York, NY (US)

( * ) Notice: Subject to any disclaimer, the term of this patent is extended or adjusted under 35 U.S.C. 154(b) by 16 days.

(21) Appl. No.: 17/644,573

(22) Filed: Dec. 16, 2021

(65) Prior Publication Data
US 2023/0195300 A1 Jun. 22, 2023

(51) Int. Cl.
*G06F 3/0485* (2022.01)
*G06F 3/14* (2006.01)
*G06F 40/143* (2020.01)

(52) U.S. Cl.
CPC ............... *G06F 3/0485* (2013.01); *G06F 3/14* (2013.01); *G06F 40/143* (2020.01)

(58) Field of Classification Search
CPC .......... G06F 3/0485; G06F 3/14; G06F 40/143
See application file for complete search history.

(56) References Cited

U.S. PATENT DOCUMENTS

| | | | | |
|---|---|---|---|---|
| 9,417,759 | B1* | 8/2016 | Srinivasan et al. | G06F 3/0483 |
| 2014/0101609 | A1* | 4/2014 | Bamford et al. | G06F 3/0489 |
| | | | | 715/810 |
| 2016/0012022 | A1* | 1/2016 | Lim | G06F 40/143 |
| | | | | 715/204 |
| 2019/0235720 | A1* | 8/2019 | Zhang et al. | G06F 3/0485 |
| 2021/0266355 | A1* | 8/2021 | Mendez et al. | H04L 67/02 |
| 2022/0374482 | A1* | 11/2022 | G Rao et al. | G06F 16/958 |

* cited by examiner

*Primary Examiner* — James T Tsai
(74) *Attorney, Agent, or Firm* — Yee & Associates, P.C.

(57) ABSTRACT

A method, apparatus, system, and computer program code for controlling a display of dynamic data updates is provided. A scroll position is determined for a viewport. The viewport chronologically displays a sequence of dynamic data within a graphical user interface. Responsive to determining that the scroll position is a top-of-page, a set of data updates is retrieved from a buffer. The sequence of dynamic data displayed in the viewport is updated with the set of data updates. The viewport is updated only when the scroll position is the top-of-page.

21 Claims, 9 Drawing Sheets

CONTROLLED DISPLAY OF DYNAMIC DATA

BACKGROUND

1. Field

The disclosure relates generally to an improved computer system and, more specifically, to a method, apparatus, computer system, and computer program product for controlling the display of dynamic data.

2. Description of the Related Art

Mobile devices, such as mobile phones and personal digital assistants (PDAs) have become ubiquitous and are commonly used as replacements for personal computers. However, the small size of these mobile devices dramatically reduces the available on-screen real estate. Mobile terminals also generally have small screens, often incorporating a user input, such as a keypad or very small keyboard which is often awkward to use. Due to these limitations, accessing and displaying information on a mobile device can be more awkward than on a typical personal computer.

SUMMARY

According to one embodiment of the present invention, a method provides for controlling a display of dynamic data updates. The method comprises determining a scroll position for a viewport. The viewport chronologically displays a sequence of dynamic data within a graphical user interface. Responsive to determining that the scroll position is a top-of-page, a set of data updates is retrieved from a buffer. The sequence of dynamic data displayed in the viewport is updated with the set of data updates. The viewport is updated only when the scroll position is the top-of-page.

According to another embodiment of the present invention, a computer system for controlling a display of dynamic data updates comprises a number of storage devices configured to store program instructions, and a number of processors operably connected to the storage devices. The number of processors are configured to execute the program instructions to cause the system to: determine a scroll position for a viewport, wherein the viewport chronologically displays a sequence of dynamic data within a graphical user interface; responsive to determining that the scroll position is a top-of-page, retrieve a set of data updates from a buffer; and update the sequence of dynamic data displayed in the viewport with the set of data updates, wherein the viewport is updated only when the scroll position is the top-of-page.

According to yet another embodiment of the present invention, a computer program product for controlling a display of dynamic data updates comprises a computer readable storage medium having program instructions embodied therewith. The program instructions are executable by a computer system to cause the computer system to perform a method of: determining a scroll position for a viewport, wherein the viewport chronologically displays a sequence of dynamic data within a graphical user interface; responsive to determining that the scroll position is a top-of-page, retrieving a set of data updates from a buffer; and updating the sequence of dynamic data displayed in the viewport with the set of data updates, wherein the viewport is updated only when the scroll position is the top-of-page.

DETAILED DESCRIPTION

The illustrative embodiments recognize and take into account one or more different considerations. For example, the illustrative embodiments recognize and take into account that quickly and efficiently accessing information on computing devices with small screens is problematic. With conventional user interfaces, a user may need to scroll around the page, switching views many times to locate the desired data. When data is streamed, or dynamically updated, the interface itself may also be dynamically updated, shifting a view of the page and disrupting access to a particular data element.

Thus, the illustrative embodiments recognize and take into account that it would be desirable to have a method, apparatus, computer system, and computer program product that takes into account the issues discussed above as well as other possible issues. For example, it would be desirable to have a method, apparatus, computer system, and computer program product that provides for increased comprehension and speed at which information, such as dynamic data, can be accessed and comprehended on a small display as compared with using current systems.

In one illustrative example, a computer system is provided for controlling a display of dynamic data updates comprising a number of storage devices configured to store program instructions, and a number of processors operably connected to the storage devices. The number of processors are configured to execute the program instructions to cause the system to: determine a scroll position for a viewport, wherein the viewport chronologically displays a sequence of dynamic data within a graphical user interface; responsive to determining that the scroll position is a top-of-page, retrieve a set of data updates from a buffer; and update the sequence of dynamic data displayed in the viewport with the set of data updates, wherein the viewport is updated only when the scroll position is the top-of-page.

Figure 1:
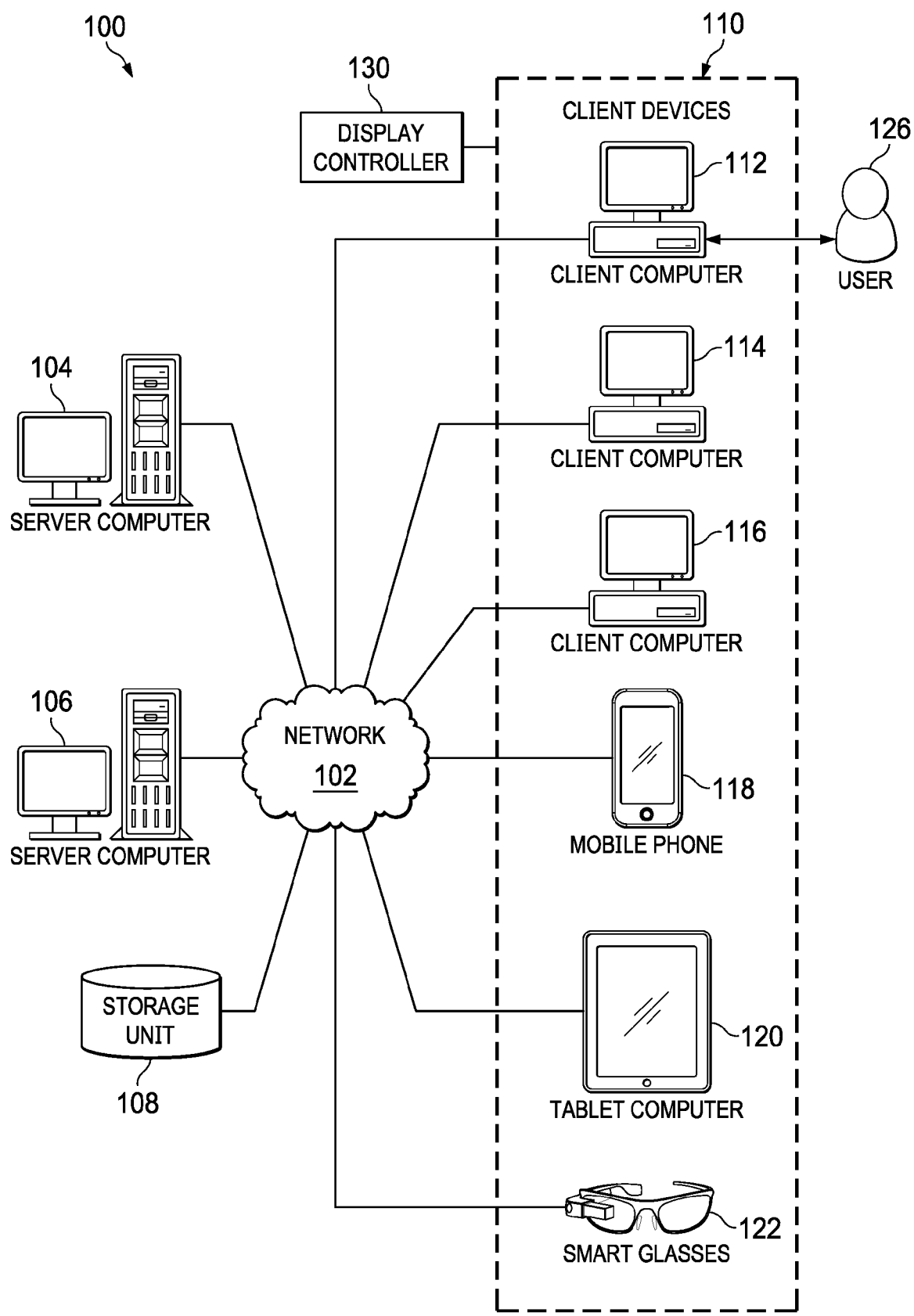
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage media and downloaded to a data processing system or other device for use. For example, the program code can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, a "number of," when used with reference to items, means one or more items. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, display controller 130 can run on client computer 114. In another illustrative example, display controller 130 can be run in a remote location such as on server computer 104. In yet other illustrative examples, display controller 130 can be distributed in multiple locations within network data processing system 100. For example, display controller 130 can run on client computer 112 and on client computer 114 or on client computer 112 and server computer 104 depending on the particular implementation.

Display controller 130 can operate to control a display of dynamic data updates. Display controller 130 overcomes the limitations of other systems by holding data updates in a buffer and updating the viewport only when the scroll position is the top-of-page. Data updates are chronologically stored in the buffer as they are received. Display controller 130 is configured to retrieve a set of data updates from a buffer in response to determining that the scroll position is a top-of-page, such that the viewport is updated only when the scroll position is the top-of-page. Controlling a display of dynamic data updates in this manner eliminates disruptions to the user experience caused by, for example, the sequence shifting of individual data items within a viewport due to page updates.

Figure 2:
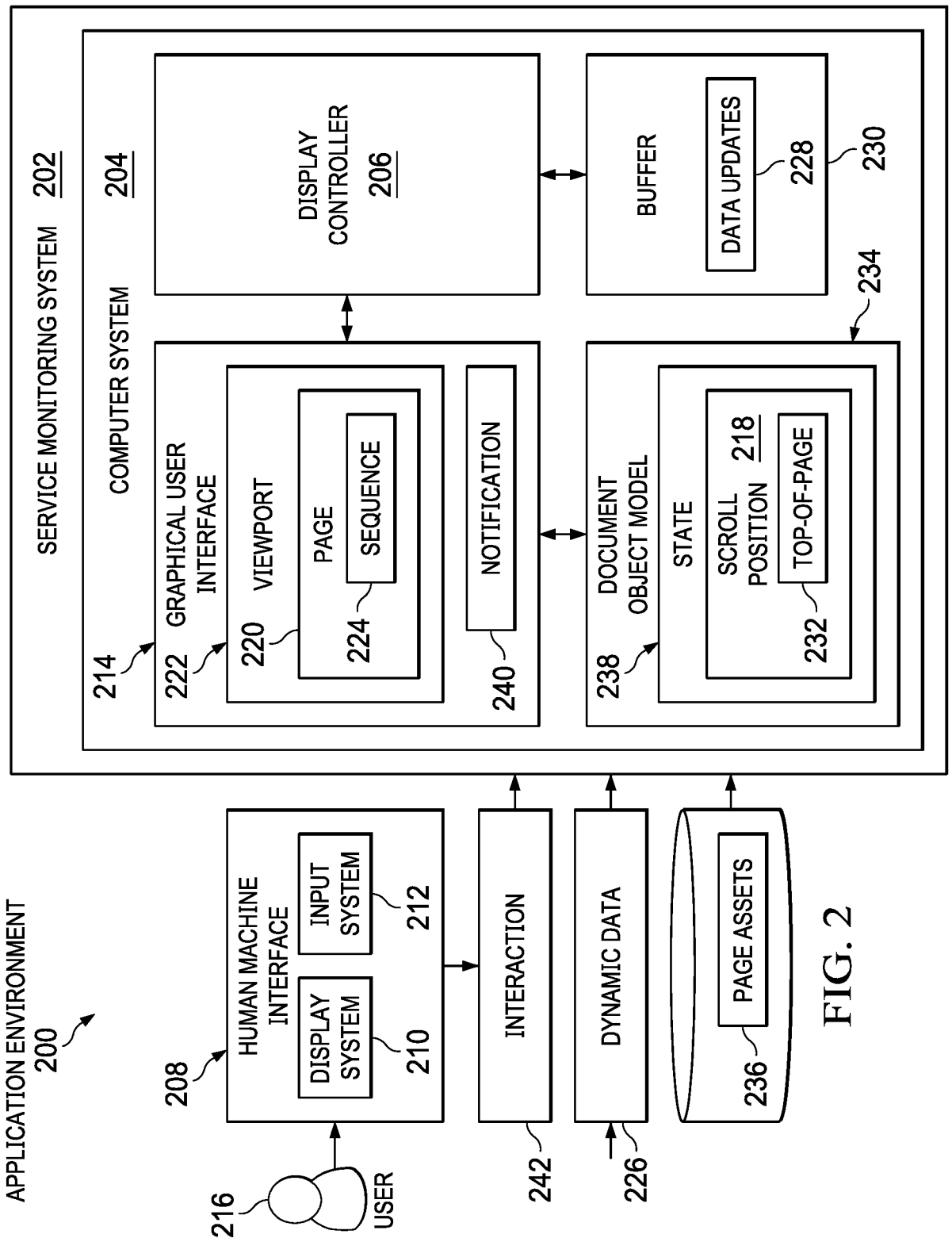
FIG. 2 is a block diagram of an application environment depicted in accordance with an illustrative embodiment.

With reference now to FIG. 2, a block diagram of an application environment is depicted in accordance with an illustrative embodiment. In this illustrative example, application environment 200 includes components that can be implemented in hardware such as the hardware shown in network data processing system 100 in FIG. 1.

As depicted, display control system 202 comprises computer system 204 and display controller 206. Display controller 206 runs in computer system 204. Display controller 206 can be implemented in software, hardware, firmware, or a combination thereof. When software is used, the operations performed by display controller 206 can be implemented in program code configured to run on hardware, such as a processor unit. When firmware is used, the operations performed by display controller 206 can be implemented in program code and data and stored in persistent memory to run on a processor unit. When hardware is employed, the hardware may include circuits that operate to perform the operations in display controller 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, human machine interface 208 comprises display system 210 and input system 212. Display system 210 is a physical hardware system and includes one or more display devices on which graphical user interface 214 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

User 216 is a person that can interact with graphical user interface 214 through user input generated by input system 212 for computer system 204. Input system 212 is a physical hardware system and can be selected from at least one of a mouse, a keyboard, a trackball, a touchscreen, a stylus, a motion sensing input device, a gesture detection device, a cyber glove, or some other suitable type of input device.

In one or more illustrative embodiments, graphical user interface 214 solves problems of prior graphical user interface devices (GUIs), in the context of dynamically updated data, relating to speed, accuracy, and usability. Rather than reciting a mathematical algorithm, a fundamental economic or longstanding commercial practice, or a challenge in business, graphical user interface 214 improves on existing graphical user interface devices that do not have no pre-electronic trading analog. The embodiments of graphical user interface 214 provide significantly more than prior graphical user interface devices that merely allow for setting, displaying, and selecting data or information that is visible on a graphical user interface device. Instead, graphical user interface 214 utilizes a specific, structured interface directly related to a prescribed functionality that resolves a specifically identified problem of controlling the display of dynamic data updates.

Furthermore, the specific structure and concordant functionality of graphical user interface 214 distinguishes this system as compared to conventional computer implementations of known procedures. The function of graphical user interface 214 is not simply the generalized use of computer system 204 as a tool to conduct a known or obvious process. Instead, graphical user interface 214 provides an inventive concept that allows for controlling the display of dynamic data updates based on the determined state of a graphical user interface. Rather than the routine or conventional use of computers or the Internet, graphical user interface 214 overcomes problems that are necessarily rooted in computer technology and that specifically arise in the realm of computer networks, resulting in an improvement to the capabilities of display control system 202.

In this illustrative example, human machine interface 208 can enable user 216 to interact with one or more computers or other types of computing devices in computer system 204. For example, these computing devices can be client devices such as client devices 110 in FIG. 1.

In this illustrative example, display controller 206 in computer system 204 is configured to determine scroll position 218 of page 220 displayed in viewport 222. The viewport 222 chronologically displays sequence 224 of dynamic data 226 within graphical user interface 214.

As used herein, a "viewport" is the visual area of a page as it is displayed on a device screen or monitor, such as display system 210. Pages that include large amounts of data are often too large to fit on smaller screens. To see the additional content on the page, a user needs to scroll the viewport, either vertically or horizontally.

As used herein, "dynamic data," also sometimes referred to as streaming data, is information that is periodically updated, changing asynchronously over time as new information becomes available different from one or more different sources. With dynamic data 226, sequence 224 of page 220 is updated to reflect the chronology of the data events. As new content is received, sequence 224 is shifted downward, and new data is inserted into sequence 224 at the top of page 220.

In existing systems, these data updates can be disruptive to the user experience, especially when scrolling the viewport to viewing data. For example, as the sequence is shifted due to page updates, individual data items may move within the viewport. This movement can be especially troublesome when viewing rapidly changing data streams that are frequently updated, such as commodity indices and prices.

Display controller 206 overcomes the limitations of other systems by holding data updates 228 in buffer 230 and updating viewport 222 only when the scroll position 218 is top-of-page 232. In this illustrative example, data updates 228 are chronologically stored in buffer 230 as they are received. Display controller 206 is configured to retrieve the set of data updates 228 from buffer 230 in response to determining that scroll position 218 is top-of-page 232. Display controller updates sequence 224 of dynamic data 226 displayed in viewport 222 with the set of data updates 228 retrieved from buffer 230. The viewport 222 is updated only when scroll position 218 is top-of-page 232.

In one illustrative example, receiving the set of data updates 228 into buffer 230 and updating the sequence 224 of dynamic data 226 displayed in viewport 222 is performed asynchronously by determining mutations within document object model 234. Mutations can be observed using one or more reactive programming libraries, such as Reactive Extensions for JavaScript (RXJS).

Reactive Extensions (Rx) is an application programming interface (API) for asynchronous and event-based programs using observable sequences and LINQ-style query operators. Rather than actively poll for events, applications subscribe to observable sequences to receive asynchronous notifications of new data and events. Applications then react to events that are pushed from a subscribed observable source.

The Rx push model is represented by the observable pattern of Observable/Observer, wherein the Observable automatically notifies subscribed Observers of any state changes in the observable sequences. These observable sequences represent data sequences, such as a stream of data from a file or web service, web services requests, system notifications, or a series of events such as user input.

In one illustrative example, display controller 206 determines scroll position 218 for viewport 222 by generating document object model 234 from page assets 236 used to display sequence 224 of dynamic data 226. Page assets can include any images, CSS, HTML files, and JavaScript, as well as other suitable resources that are necessary to render and display page 220.

The Document Object Model (DOM) is an application programming interface (API) for valid HTML and well-formed XML documents. It defines the logical structure of documents, illustrating the logical relationships among page assets. The document object model encompasses not only the structure of the page, but also the behavior of page and the assets that compose the page. Rather than merely persisting page assets, the document object model expresses how page assets are represented, accessed, and manipulated in a graphical user interface.

In this illustrative example, display controller 206 can then observe a state 238 of document object model 234 associated with scroll position 218. Display controller 206 may observe state 238 of document object model 234 for example, by calling a get-position function, observing a scroll event, or combinations thereof.

In one illustrative example, display controller 206 updating sequence 224 of dynamic data 226 in near real-time when scroll position 218 is top-of-page 232. As used herein, "near real-time" refers to the time delay, introduced by automated data processing or network transmission, between the occurrence of an event and the use of the processed data, such as for display or feedback and control purposes.

In response to determining that scroll position 218 is top-of-page 232, display controller 206 retrieving the set of data updates 228 from buffer 230 in near real-time as the set of data updates 228 is received. Display controller 206 updates sequence 224 of dynamic data 226 displayed in viewport 222 in near real-time as the set of data updates 228 are received.

In one illustrative example, display controller 206 may display notification 240 that the set of data updates 228 have been received. Display controller 206 may display notification 240 in response to determining that scroll position 218 is not top-of-page 232.

In one illustrative example, notification 240 is a control element that is overlain atop sequence 224 of dynamic data 226 in viewport 222. As used herein, a "control element" is a graphical and/or functional object that can be manipulated by the user to perform some action. The control element can be, for example, a button, or pop-up, as well as other suitable elements. The control element may be rendered from page assets 236.

In this illustrative example, display controller 206 receives an interaction 242 with notification 240. The interaction 242 can be received from input system 212. Responsive to receiving interaction 242, display controller 206 sets scroll position 218 to top-of-page 232.

In one illustrative example, one or more solutions are present that overcome a problem with controlling a display of dynamic data 226 updates. As a result, one or more illustrative examples may overcome the limitations of other systems by holding data updates 228 in buffer 230 and updating viewport 222 only when scroll position 218 is top-of-page 232. Data updates are chronologically stored the set of in buffer 230 as they are received. Display controller 206 is configured to retrieve a set of data updates 228 from buffer 230 in response to determining that scroll position 218 is top-of-page 232, such that viewport 222 is updated only when scroll position 218 is top-of-page 232. Controlling a display of dynamic data 226 updates in this manner eliminates disruptions to the user experience caused by, for example, sequence 224 shifting of individual data items within viewport 222 when page 220 is updated.

Computer system 204 can be configured to perform at least one of the steps, operations, or actions described in the different illustrative examples using software, hardware, firmware, or a combination thereof. As a result, computer system 204 operates as a special purpose computer system in display controller 206 in computer system 204. In particular, display controller 206 transforms computer system 204 into a special purpose computer system as compared to currently available general computer systems that do not have display controller 206. In this example, computer system 204 operates as a tool that can increase at least one of speed, accuracy, or usability of computer system 204. In particular, this increase in performance of computer system 204 can be for the use of graphical user interface 214 by user 216. In one illustrative example, display controller 206 provides for increased comprehension and speed at which information, such as dynamic data 226, can be accessed and comprehended by user 216 as compared with using current systems.

The illustration of application environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 3:
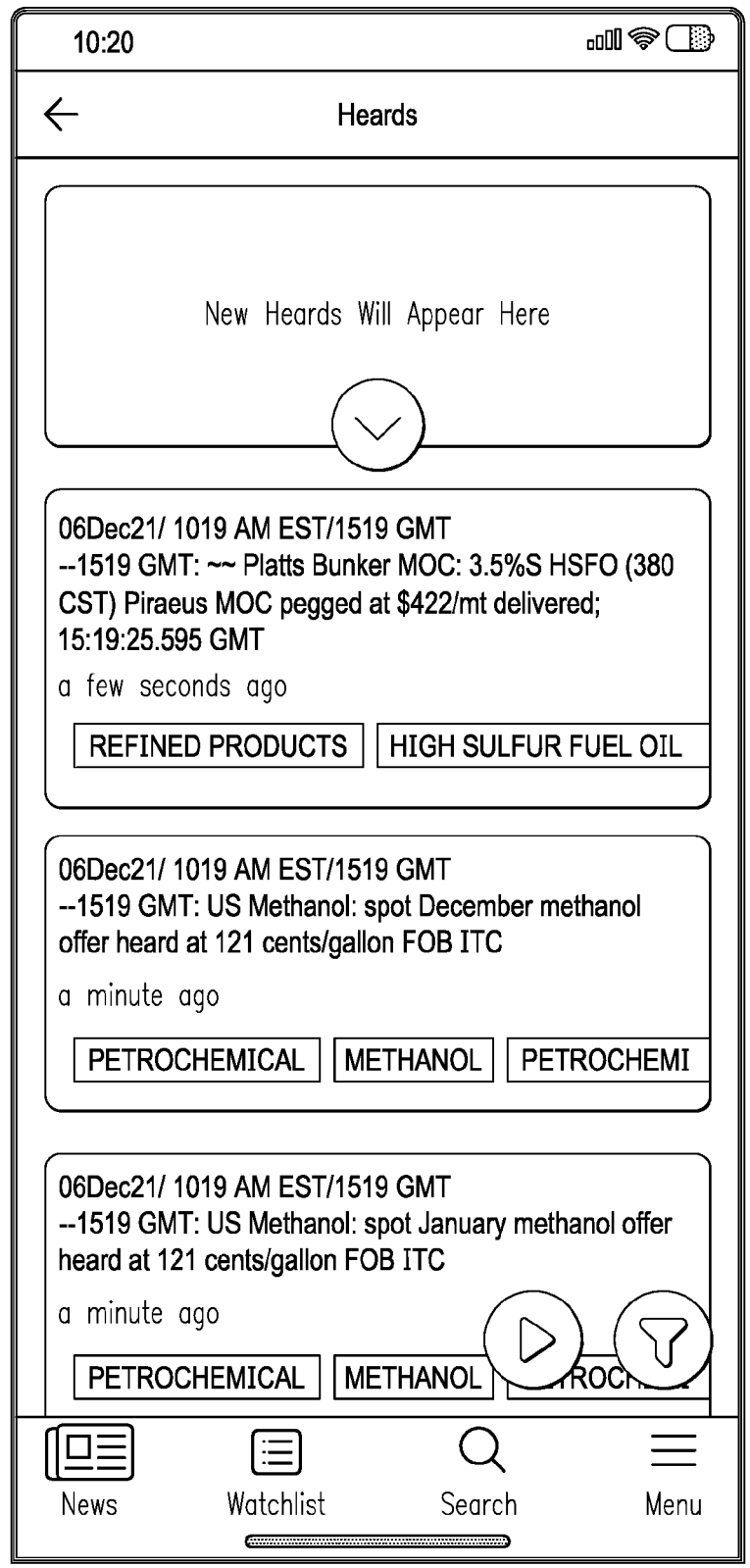
FIG. 3 is a graphical user interface displaying a page of dynamic data depicted in accordance with an illustrative embodiment.

With reference to FIG. 3, a graphical user interface displaying a page of dynamic data is depicted in accordance with an illustrative embodiment. As depicted, graphical user interface 300 is an example one implementation for graphical user interface 140 in FIG. 1 and graphical user interface 214 in FIG. 2.

As depicted, graphical user interface includes sequence 310 of dynamic data. Sequence 310 is an example of sequence 224 of FIG. 2. Dynamic data is displayed chronologically, with newer data items being inserted at the top of sequence 310.

Figure 4:
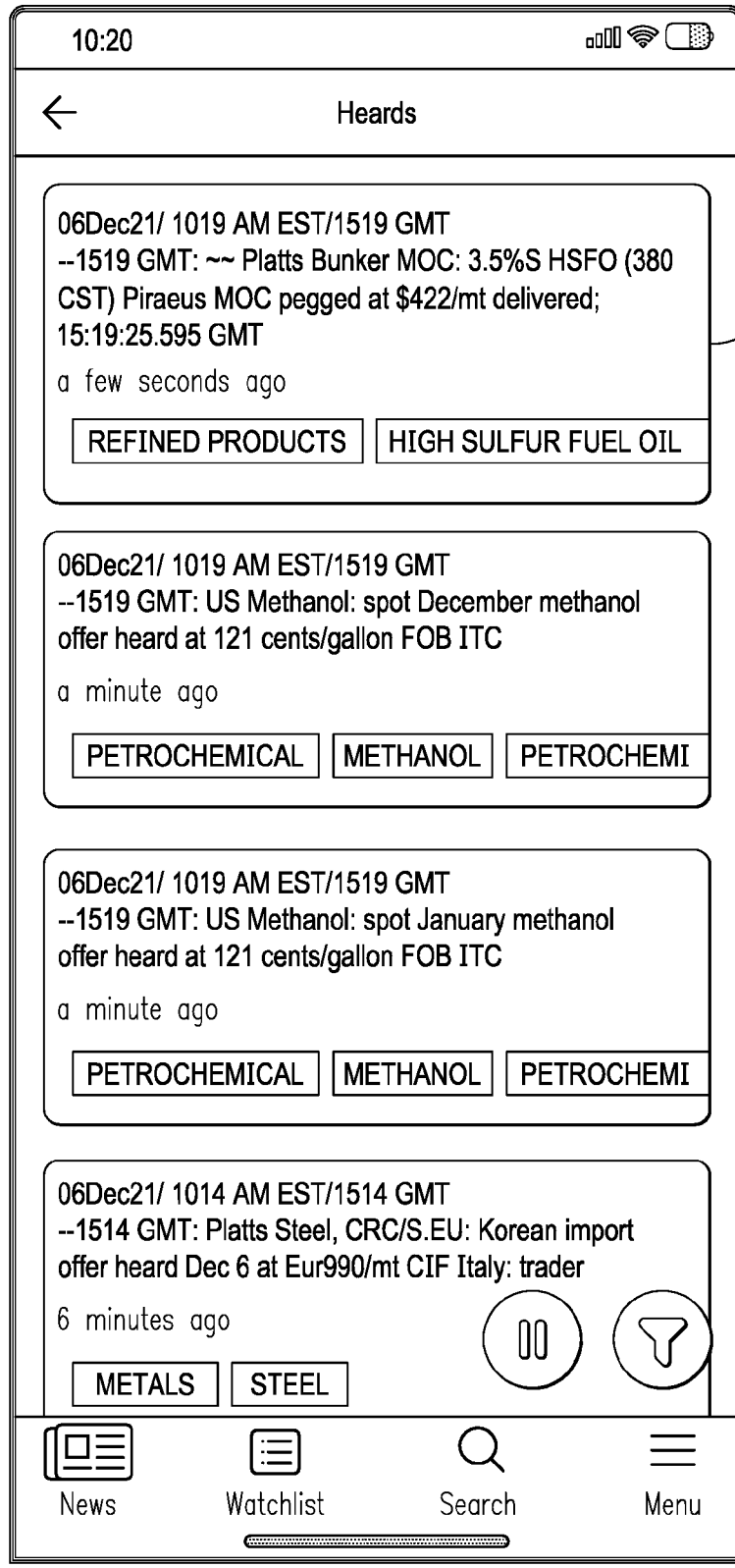
FIG. 4 is a graphical user interface displaying an updated page of dynamic data depicted in accordance with an illustrative embodiment.

With reference to FIG. 4, a graphical user interface displaying an updated page of dynamic data is depicted in accordance with an illustrative embodiment. As depicted, data update 400 has been received and inserted into sequence 310 of dynamic data.

As depicted, a top the page of dynamic data is viewable within the viewport of graphical user interface 300. As dynamic data is received, the sequence 310 is shifted downward, and data update 400 is inserted into the sequence 310 at the top of the page.

Figure 5:
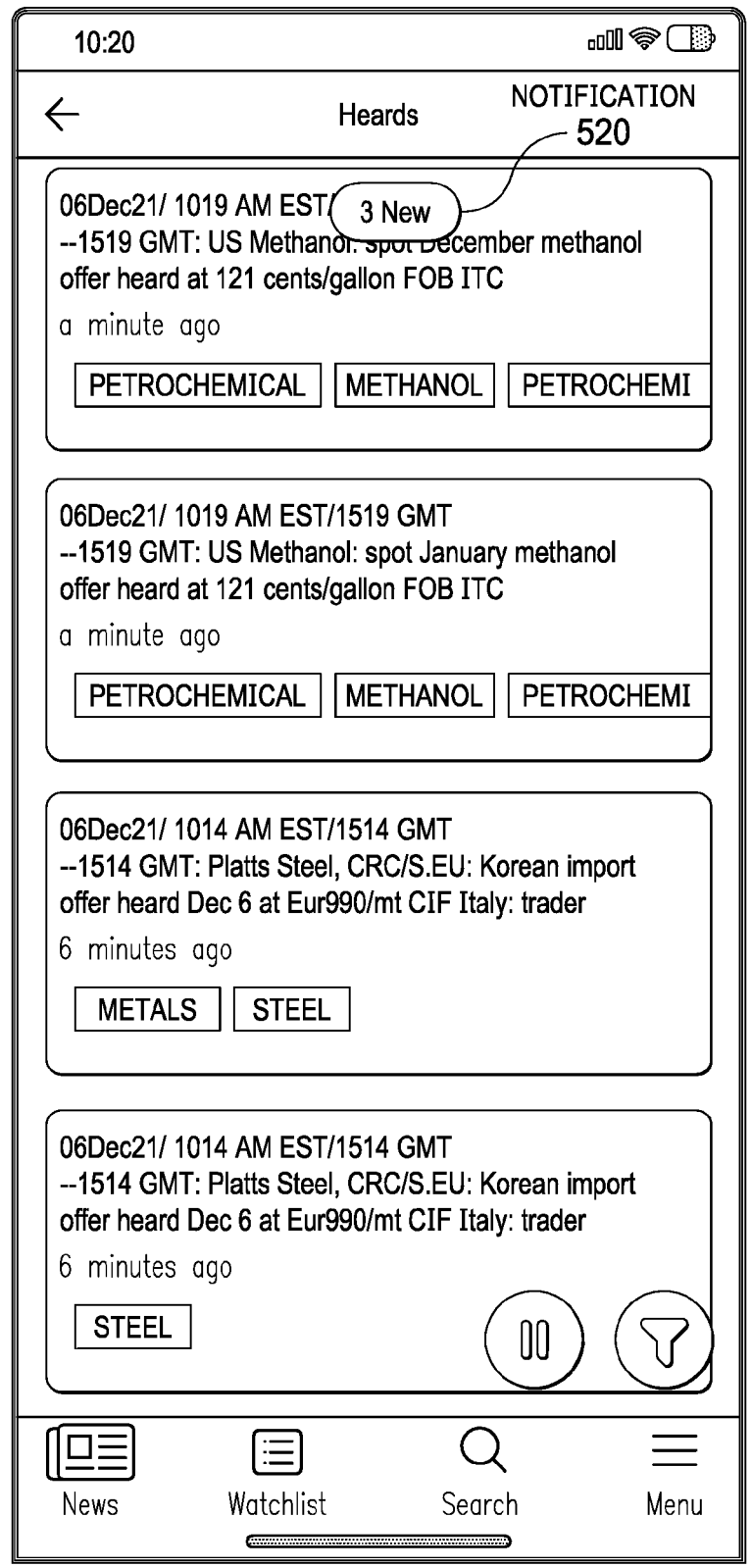
FIG. 5 is a graphical user interface displaying a page of dynamic data with controlled data updates depicted in accordance with an illustrative embodiment.

With reference to FIG. 5, a graphical user interface displaying a page of dynamic data with controlled data updates is depicted in accordance with an illustrative embodiment. As depicted, the viewport of graphical user interface 300 has been scrolled to display a different portion of the sequence 310.

When data updates are received, notification 520 is displayed overlain atop the sequence 310. Notification 520 is an interactive control element that sets the scroll position to top of page in response to a user interaction with the control.

Figure 6:
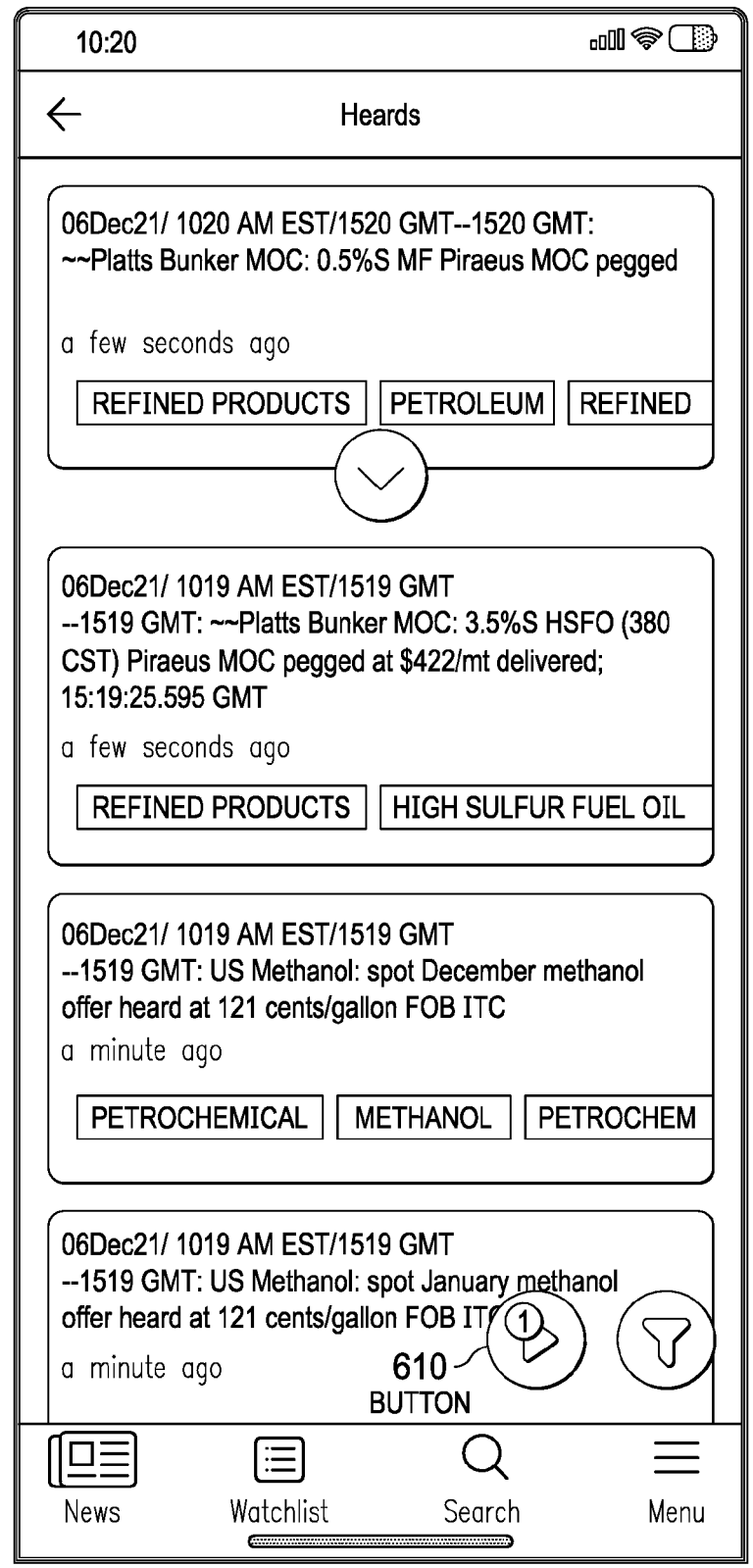
FIG. 6 is another example of a graphical user interface displaying a page of dynamic data with controlled data updates depicted in accordance with an illustrative embodiment.

With reference to FIG. 6, a graphical user interface displaying a page of dynamic data with controlled data updates is depicted in accordance with an illustrative embodiment.

As depicted, the viewport of graphical user interface 300 includes pause/play button 610. Pause/play button 610 is an interactive control element that sets the scroll position to top of page in response to a user interaction with the control.

When pause/play button 610 is set to a pause state, users can scroll through sequence 310 while preserving a visible holding area at the top of graphical user interface 300 where new content is published and stacked. When pause/play button 610 is set to a play state, the holding area releases the newly published content into the sequence 310 and the user is returned to the top of graphical user interface 300.

The illustrations of graphical user interface in FIGS. 3-6 are provided as one illustrative example of an implementation for controlling a display of dynamic data updates and are not meant to limit the manner in which the display of dynamic data updates can be generated and presented in other illustrative examples. In one example, the viewport of graphical user interface 300 can be minimized, resized, or closed to enable viewing of other applications and hidden portions of graphical user interface 300.

Figure 7:
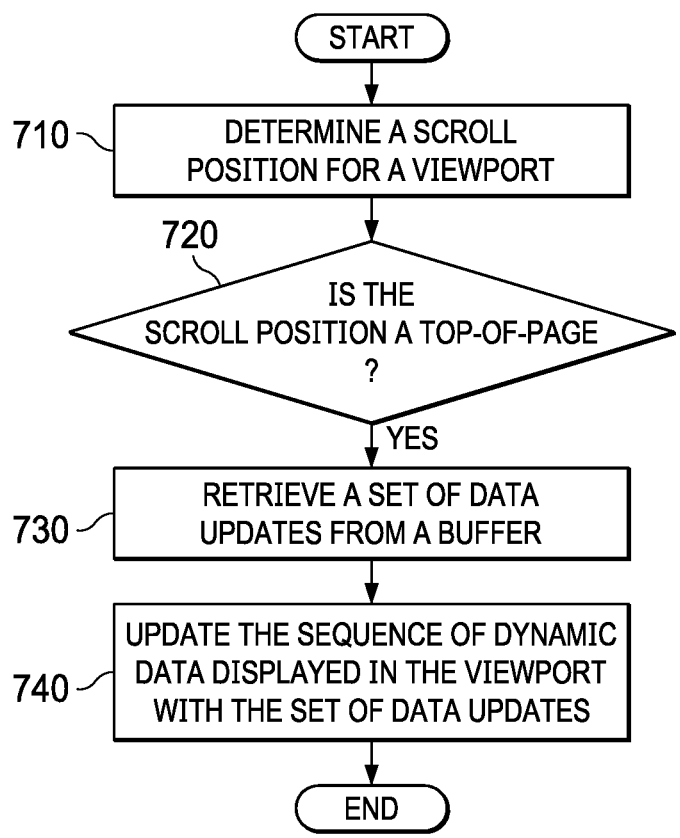
FIG. 7 is a flowchart of a process for controlling a display of dynamic data updates depicted in accordance with an illustrative embodiment.

Turning next to FIG. 7, a flowchart of a process for controlling a display of dynamic data updates is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in display controller 206 in computer system 204 in FIG. 2.

The process begins by determining a scroll position for a viewport (step 710). The viewport chronologically displays a sequence of dynamic data within a graphical user interface.

In responsive to determining that the scroll position is a top-of-page ("yes" at step 720), the process retrieves a set of data updates from a buffer (step 730). The process updates the sequence of dynamic data displayed in the viewport with the set of data updates (step 740). Thereafter, the process terminates. Receiving the set of data updates and updating the sequence of dynamic data displayed in the viewport is performed asynchronously. In this manner, the viewport is updated only when the scroll position is the top-of-page.

Figure 8:
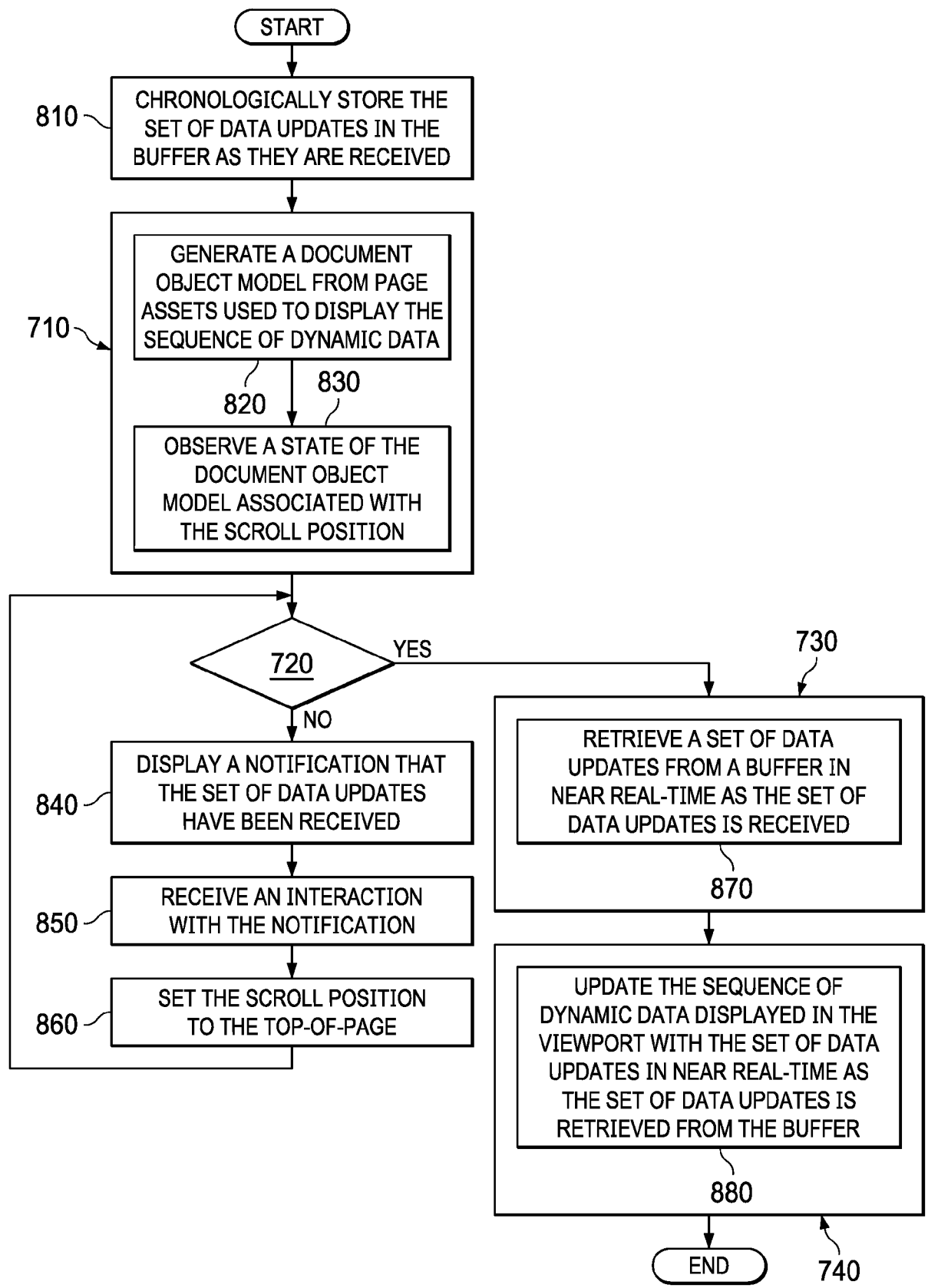
FIG. 8 is a flowchart of a process for controlling a display of dynamic data updates including additional processing steps depicted in accordance with an illustrative embodiment.

With reference next to FIG. 8, a flowchart of a process for controlling a display of dynamic data updates is depicted in accordance with an illustrative embodiment. The process in FIG. 8 is an example of additional processing steps that can be implemented in conjunction with the process of FIG. 7.

The process begins by chronologically storing a set of data updates in a buffer as they are received (step 810). Thereafter, the process continues to step 710 to determine a scroll position for a viewport.

In this illustrative example, step 710 includes generating a document object model from page assets used to display the sequence of dynamic data (step 820). The process observes a state of the document object model associated with the scroll position (step 830). Thereafter, the process continues to step 720 to determining whether the scroll position is a top-of-page.

In responsive to determining that the scroll position is not a top-of-page ("no" at step 720), the process displays a notification that the set of data updates have been received (step 840). The notification can be a control element that is overlain atop the sequence of dynamic data in the viewport.

Sometime thereafter, a process receives an interaction with the notification (step 850). In response, the process sets the scroll position to the top-of-page (step 860). Thereafter, the process returns to step 720.

Returning now to step 720, responsive to determining that the scroll position is a top-of-page ("yes" at step 720), the process proceeds to step 730 to update the sequence of dynamic data. In this illustrative example, the process retrieves the set of data updates from the buffer in near real-time as the set of data updates is received (step 870), and thereafter proceeds to step 740.

In this illustrative example, step 640 includes updating the sequence of dynamic data displayed in the viewport in near real-time as the set of data updates is retrieved from the buffer open parentheses step 880). Thereafter, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 9:
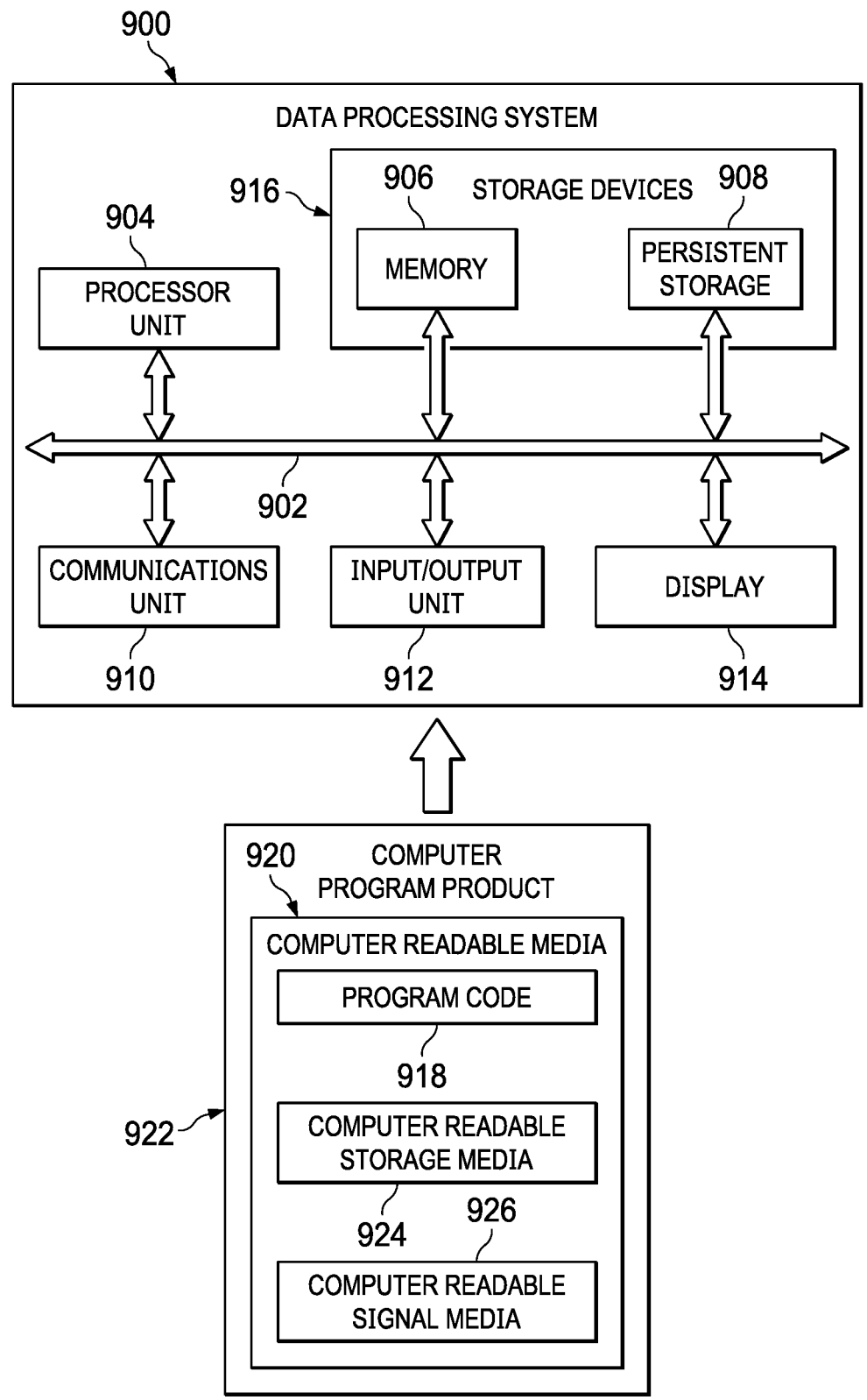
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. Data processing system 900 can also be used to implement computer system 204 in FIG. 2. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor. Further, processor unit 904 can may be implemented using one or more heterogeneous processor systems in which a main processor is present with secondary processors on a single chip. As another illustrative example, processor unit 904 can be a symmetric multi-processor system containing multiple processors of the same type on a single chip.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are program instructions and are also referred are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918. Computer-readable storage media 924, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The term "non-transitory" or "tangible", as used herein, is a limitation of the medium itself (i.e., tangible, not a signal) as opposed to a limitation on data storage persistency (e.g., RAM vs. ROM).

Alternatively, program code 918 can be transferred to data processing system 900 using a computer-readable signal media. The computer-readable signal media are signals and can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, may be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for controlling a display of dynamic data updates, the computer implemented method comprising:
   determining, by a number of processor units, a scroll position for a viewport, wherein the viewport chronologically displays a sequence of the dynamic data within a graphical user interface;
   responsive to determining that the scroll position is a top-of-page, retrieving, by the number of processor units, a set of data updates from a buffer;
   automatically updating, by the number of processor units, the sequence of the dynamic data displayed in the viewport with the set of data updates, wherein the viewport is updated only when the scroll position is the top-of-page, and wherein the viewport is updated without requiring any further input from users;
   in response to the detection of a selection of a play-pause button to toggle into a paused state, pausing, by the number of processor units, the updating of the sequence of the dynamic data displayed in the viewport, wherein the viewport comprises a visible holding area at the top of the graphical user interface to stack and publish a portion less than all of the set of data updates received during the pause, and wherein the play-pause button is visible on the graphical user interface; and
   in response to the detection of a selection of the play-pause button to toggle into a playing state, releasing, by the number of processor units, the set of data updates that are stacked and published in the visible holding area into the sequence of the dynamic data displayed in the viewport at end of the pause.

2. The computer implemented method of claim 1, wherein receiving the set of data updates and updating the sequence of the dynamic data displayed in the viewport is performed asynchronously by determining mutations within a document object model.

3. The computer implemented method of claim 1, further comprising:
   chronologically storing, by the number of processor units, the set of data updates in the buffer as they are received.

4. The computer implemented method of claim 1, wherein determining the scroll position for the viewport further comprises:
   generating, by the number of processor units, a document object model from page assets used to display the sequence of the dynamic data; and
   observing, by the number of processor units, a state of the document object model associated with the scroll position.

5. The computer implemented method of claim 1, further comprising:
   responsive to determining that the scroll position is not the top-of-page, displaying, by the number of processor units, a notification that the set of data updates have been received.

6. The computer implemented method of claim 5, wherein the notification is a control element that is overlain atop the sequence of the dynamic data in the viewport, the computer implemented method further comprising:
   receiving, by the number of processor units, an interaction with the notification; and
   responsive to receiving the interaction, setting, by the number of processor units, the scroll position to the top-of-page.

7. The method of claim 1, wherein the sequence of the dynamic data displayed on the viewport comprises data that is periodically updated and changing asynchronously over time as new information becomes available different from one or more different sources.

8. A system for controlling a display of dynamic data updates, the system comprising:
   a number of storage devices configured to store program instructions; and
   a number of processors operably connected to the storage devices and configured to execute the program instructions to cause the system to:
   determine a scroll position for a viewport, wherein the viewport chronologically displays a sequence of the dynamic data within a graphical user interface;
   responsive to determining that the scroll position is a top-of-page, retrieve a set of data updates from a buffer;
   automatically update the sequence of the dynamic data displayed in the viewport with the set of data updates, wherein the viewport is updated only when the scroll position is the top-of-page, and wherein the viewport is updated without requiring any further input from users;
   in response to the detection of a selection of a play-pause button to toggle into a paused state, pause the updating of the sequence of the dynamic data displayed in the viewport, wherein the viewport comprises a visible holding area at the top of the graphical user interface to stack and publish a portion less than all of the set of data updates received during the pause, and wherein the play-pause button is visible on the graphical user interface; and
   in response to the detection of a selection of the play-pause button to toggle into a playing state, release the set of data updates that are stacked and published in the visible holding area into the sequence of the dynamic data displayed in the viewport at end of the pause.

9. The system of claim 8, wherein receiving the set of data updates and updating the sequence of the dynamic data displayed in the viewport is performed asynchronously by determining mutations within a document object model.

10. The system of claim 8, further comprising:
    chronologically storing the set of data updates in the buffer as they are received.

11. The system of claim 8, wherein determining the scroll position for the viewport further comprises:
    generating a document object model from page assets used to display the sequence of the dynamic data; and
    observing a state of the document object model associated with the scroll position.

12. The system of claim 8, further comprising:
    responsive to determining that the scroll position is not the top-of-page, displaying a notification that the set of data updates have been received.

13. The system of claim 12, wherein the notification is a control element that is overlain atop the sequence of the dynamic data in the viewport, the system further comprising:
    receiving an interaction with the notification; and
    responsive to receiving the interaction, setting the scroll position to the top-of-page.

14. The system of claim 8, wherein the sequence of the dynamic data displayed on the viewport comprises commodity data that is periodically updated and changing asynchronously over time as new information becomes available different from one or more different sources.

15. A computer program product for controlling a display of dynamic data updates, the computer program product comprising:
   a computer readable storage medium having program code embodied therewith, the program code executable by a computer system to cause the computer system to perform a method of:
      determining a scroll position for a viewport, wherein the viewport chronologically displays a sequence of the dynamic data within a graphical user interface;
      responsive to determining that the scroll position is a top-of-page, retrieving a set of data updates from a buffer;
      automatically updating the sequence of the dynamic data displayed in the viewport with the set of data updates, wherein the viewport is updated only when the scroll position is the top-of-page, and wherein the viewport is updated without requiring any further input from users;
      in response to the detection of a selection of a play-pause button to toggle into a paused state, pausing the updating of the sequence of the dynamic data displayed in the viewport, wherein the viewport comprises a visible holding area at the top of the graphical user interface to stack and publish a portion less than all of the set of data updates received during the pause, and wherein the play-pause button is visible on the graphical user interface; and
      in response to the detection of a selection of the play-pause button to toggle into a playing state, releasing the set of data updates that are stacked and published in the visible holding area into the sequence of the dynamic data displayed in the viewport at end of the pause.

16. The computer program product of claim 15, wherein receiving the set of data updates and updating the sequence of the dynamic data displayed in the viewport is performed asynchronously by determining mutations within a document object model.

17. The computer program product of claim 15, further comprising:
   chronologically storing the set of data updates in the buffer as they are received.

18. The computer program product of claim 15, wherein determining the scroll position for the viewport further comprises:
   generating a document object model from page assets used to display the sequence of the dynamic data; and
   observing a state of the document object model associated with the scroll position.

19. The computer program product of claim 15, further comprising:
   responsive to determining that the scroll position is not the top-of-page, displaying a notification that the set of data updates have been received.

20. The computer program product of claim 19, wherein the notification is a control element that is overlain atop the sequence of the dynamic data in the viewport, the method further comprising:
   receiving an interaction with the notification; and
   responsive to receiving the interaction, setting the scroll position to the top-of-page.

21. The computer program product of claim 15, wherein the sequence of the dynamic data displayed on the viewport comprises commodity data that is periodically updated and changing asynchronously over time as new information becomes available different from one or more different sources.

* * * * *